United States Patent [19]

Tucker et al.

[11] Patent Number: 5,106,192
[45] Date of Patent: Apr. 21, 1992

[54] POLARIZATION INSENSITIVE ABSOLUTE INTERFEROMETERIC METHOD AND APPARATUS FOR MEASURING POSITION ANGULAR BEARING AND OPTICAL PATHS

[75] Inventors: Michael R. Tucker; Eric S. Christenson, both of Bethlehem, Pa.

[73] Assignee: Eastman, Inc., Bethlehem, Pa.

[21] Appl. No.: 494,550

[22] Filed: Mar. 16, 1990

[51] Int. Cl.$^5$ .............................................. G01B 9/02
[52] U.S. Cl. ................................. 356/349; 356/358; 356/363
[58] Field of Search .................. 356/349, 358, 363

[56] References Cited

U.S. PATENT DOCUMENTS

| | | |
|---|---|---|
| 4,662,752 | 5/1987 | Tucker et al. |
| 4,746,216 | 5/1988 | Sommargren ........................ 356/363 |
| 4,907,886 | 3/1990 | Dandliker ........................... 356/349 |

OTHER PUBLICATIONS

N. A. Massie et al., "Telescope Alignment with the Absolute Distance Interferometer", SPIE, vol. 332, Advanced Technology Optical Telescopes (1982).
N. A. Massie et al., "Absolute Distance Interferometry" SPIE, vol. 816, Interferometric Metrology (1987).
C. C. Williams and H. K. Wickramasinghe, "Optical Ranging by Wavelength Multiplexed Interferometry", Journal of Applied Physics, vol. 60, No. 6, (Sep. 5, 1986) pp. 1900-1903.
Behim, "Fiber-Optic Interferometer Using Frequency-Modulated Laser Diodes", Applied Optics, vol. 25, No. 19 (Oct. 1, 1986), pp. 3469-3472.
Kikuta et al., "Distance Measurement by the Wavelength Shift of Laser Diode Light", Applied Optics, vol. 25, No. 17 (Sep. 1, 1986) pp. 2976-2980.
A. J. den Boef, "Two-Wavelength Scanning Spot Interferometer Using Single-Frequency Diode Lasers", Applied Optics, vol. 27, No. 2, (Jan. 15, 1988), pp. 306-311.
A. F. Fercher et al., "Rough Surface Interferometry with a Two-Wavelength Heterodyne Speckle Interferometer", Applied Optics, vol. 24, No. 14 (Jul. 15, 1985), pp. 2181-2188.
J. C. Wyant, "Testing Aspherics Using Two-Wavelength Holography", Applied Optics, vol. 10, No. 9 (Sep. 1971), pp. 2113-2118.
C. Polhemus, "Two—Wavelength Interferometry", Applied Optics, vol. 12, No. 9 (Sep. 1973), pp. 2071-2074.
Matsumoto, "Length Measurement Using Infrared Two-Wavelength He-Xe Laser Interferometer", Rev. Sci. Instrum. 53(5) (May 1982), pp. 641-643.
C. Polhemus, "Two-Wavelength Interferometry", Applied Optics. vol. 12.

Primary Examiner—Samuel A. Turner
Attorney, Agent, or Firm—Finnegan, Henderson, Farabow, Garrett & Dunner

[57] ABSTRACT

A method and apparatus for locating objects within a large range and with high accuracy through the use of a multiwave technique utilizing simultaneous phase measurements of interfering reflected and non-reflected optical radiation, comprising a plurality of different wavelengths and associated reference signals wherein the interfering reflected and non-reflected optical radiation create various heterodyne signals each having the same frequency as the associated reference signal.

3 Claims, 7 Drawing Sheets

POLARIZATION INSENSITIVE ABSOLUTE INTERFEROMETERIC METHOD AND APPARATUS FOR MEASURING POSITION ANGULAR BEARING AND OPTICAL PATHS

BACKGROUND OF THE INVENTION

1. Field of the Invention

The present invention relates to a method and apparatus for locating moving or stationary objects and, more specifically, to a method and apparatus for locating the distance of an object to a reference point and/or the angle of an object to a reference point for objects within a large range and with high accuracy through the use of reflected optical radiation comprising a plurality of different wavelengths.

2. Description of the Related Art

Various laser interferometric techniques have been utilized to measure the distance to an object. One of these techniques involves analyzing the fringes of an interference pattern created by the intersection of light waves transmitted to and reflected off an object. Although these fringe analyzing techniques can be highly accurate, their absolute range is limited to the ambiguity length of the system, i.e., the wavelength of light. Therefore, the distance to an object cannot be determined beyond the ambiguity length.

Fringe analysis, however, can be used to measure the distance to an object beyond the ambiguity wavelength by continuously directing light waves onto an object and counting the number of interference fringes produced by the intersecting transmitted and reflected waves as the object moves. However, only relative and not absolute distances can be measured with this technique. In addition, if the light waves incident on the object are interrupted, even the relative distance information is lost.

In lieu of these fringe counting techniques, multiwave techniques, wherein the phase differences are measured between a plurality of transmitted and respective reflected light waves of a different optical wavelength have been utilized to calculate absolute distances within a large range and with high accuracy. In one such method, a plurality of optical waves each having a different wavelength are sequentially reflected off an object. The phase differences between the transmitted waves and respective reflected waves are then sequentially detected and analyzed. If the object moves, however, even by an amount equal to a portion of an optical wavelength, the method of sequential phase measurements will be invalid and the measured distance will be in error. Therefore, only the distance to an object which is stationary can be determined by this sequential multiwave technique (see, Williams, C.C. and Wickramasinghe, H.K., "Optical Ranging by Wavelength Multiplexed Interferometry", *Journal of Applied Physics*, Vol. 60, No. 6, pp. 1900-1903, Sept. 5, 1986; Beheim, G., "Fiber-optic Interferometry Using Frequency Modulated Laser Diodes", *Applied Optics*, Vol. 25, No. 19, pp. 3469-3472, Oct. 1, 1986; and Kikuta, H., Iwata, K., and Nagata, R., "Distance Measurement by the Wavelength Shift of Laser Diode Light", *Applied Optics*, Vol. 25, No. 17, pp. 2976-2980, Sept. 1, 1986).

In another multiwave technique, two optical waves of distinct wavelengths and polarized at 90° to each other are directed onto an object. The phase differences between the transmitted waves and the respective reflected waves are then simultaneously detected. Before the phases can be analyzed, however, two signals created by the intersecting waves must be separated. Because, at most, only two polarizations can be separated at any one time, this method is limited to the simultaneous measurement of only two phases, i.e., the phase difference between the first transmitted optical wave and the respective reflected wave, and the phase difference between the second transmitted optical wave and the respective reflected wave. In addition, this method is limited to locating objects which are very smooth because when a light beam is reflected off a rough surface its polarization changes. This unwanted change in polarization produces crosstalk between signals thereby reducing the accuracy of the system. Thus, the polarization technique is limited to slowly moving and very smooth objects (see, den Boef, A.J., "Two-Wavelength Scanning Spot Interferometry Using Single Frequency Diode Lasers", *Applied Optics*, Vol. 27, No. 2, pp. 306-311, Jan. 15, 1988).

In another multiwave technique, two optical waves of different wavelengths are directed onto an object and their reflection is detected. The two wavelengths are mechanically separated by a dispersion prism and their phases are measured. In practice this method is limited to the simultaneous detection of just a few wavelengths since only a few wavelengths can be mechanically separated at any one time. Also, the wavelengths of the optical waves cannot be changed or tuned without modifying the optical hardware (see, A.F. Fercher, H.Z. Hu, and U. Vry "Rough Surface Interferometry with a Two-Wavelength Heterodyne Speckle Interferometer", *Applied Optics*, Vol. 24, No. 14).

SUMMARY OF THE INVENTION

Accordingly, it is an object of the present invention to provide a method and apparatus for determining the location of a moving or stationary object within a large range and with high accuracy.

Additional objects and advantages of the invention will be set fourth in the description which follows, and in part will be obvious from the description, or may be learned by practice of the invention. The objects and advantages of the invention may be realized and obtained by means of the instrumentalities and combinations particularly pointed out in the appended claims.

To achieve the foregoing objectives, and remove the limitations of the techniques in the prior art, a method is provided wherein any number of distinct optical wavelength measurement beams and corresponding same optical wavelength reference beams are used in an interferometric configuration to measure an unknown distance absolutely. The limitations of the prior art are removed by emitting, combining and measuring the phases of multiple wavelengths simultaneously. Simultaneous measurements of phase are provided by inducing a distinct frequency shift between each reference beam and corresponding measurement beam, separating the signals created by the combined reference and measurement beams corresponding to each wavelength and measuring the relative phases of the separated signals. Simultaneous, multiple phase measurements allow determination of absolute location even while the object is moving due to the fact that a long equivalent wavelength can be achieved by combining two distinct wavelengths.

Any number of wavelengths may be simultaneously combined in the present invention by techniques wherein the reference and corresponding measurement beams of each wavelength are assigned a different frequency. Various methods exist to create the distinct frequency shifts including but not limited to, acoustooptic modulators, magnetic field splitting of the emission lines of a gas laser, optical parametric amplifiers in addition to mechanical means whereby small mirrors are piezoelectrically vibrated to modify the path difference for each distinct wavelength at a distinct frequency. Different wavelengths may be created by use of separate laser sources and/or injection current tuning of such sources.

In a preferred embodiment, a method of measuring the distance between an object and a reference point using first and third optical beams which have the same first wavelength and are coherent with each other, and second and fourth optical beams which have the same second wavelength and are coherent with each other, the second wavelength being different from the first wavelength, is provided comprising the steps of frequency shifting one of the first and third beams using a first reference signal having a first reference frequency, frequency shifting one of the second and fourth beams using a second reference signal having a second reference frequency different from the first reference frequency, directing the first and second beams from the reference point onto a surface of the object so that portions of the first and second beams are reflected from the object, simultaneously combining the reflected first and second beams with the third and fourth beams at a reference location a fixed optical distance from the reference point to produce a combined optical signal, simultaneously detecting from the combined optical signal a first heterodyne signal having a first beat frequency equal to the first reference frequency, and a second heterodyne signal having a second beat frequency equal to the second reference frequency, measuring the phase difference between the first heterodyne signal and the first reference signal, and the phase difference between the second heterodyne signal and the second reference signal, and employing the phase differences to determine the distance between the object and the reference point.

Preferably, the method comprises the preliminary steps of splitting the output of a first laser diode into the first and third optical beams and splitting the output of a second laser diode into the second and fourth optical beams.

Still further, the measurement method of the present invention is repeated in three nonplanar axes to determine the position and orientation of the object with respect to the reference point.

The measurement method of the present invention may also be used to measure the angular bearing of the object with respect to a reference line.

BRIEF DESCRIPTION OF THE DRAWINGS

The accompanying drawings, which are incorporated in and constitute a part of the specification, illustrate the presently preferred apparatus and method of the invention and, together with the general description given above and the detailed description of the preferred embodiment given below, serve to explain the principles of the invention. Of the drawings.

DESCRIPTION OF THE PREFERRED EMBODIMENTS AND METHOD

Figure 1:
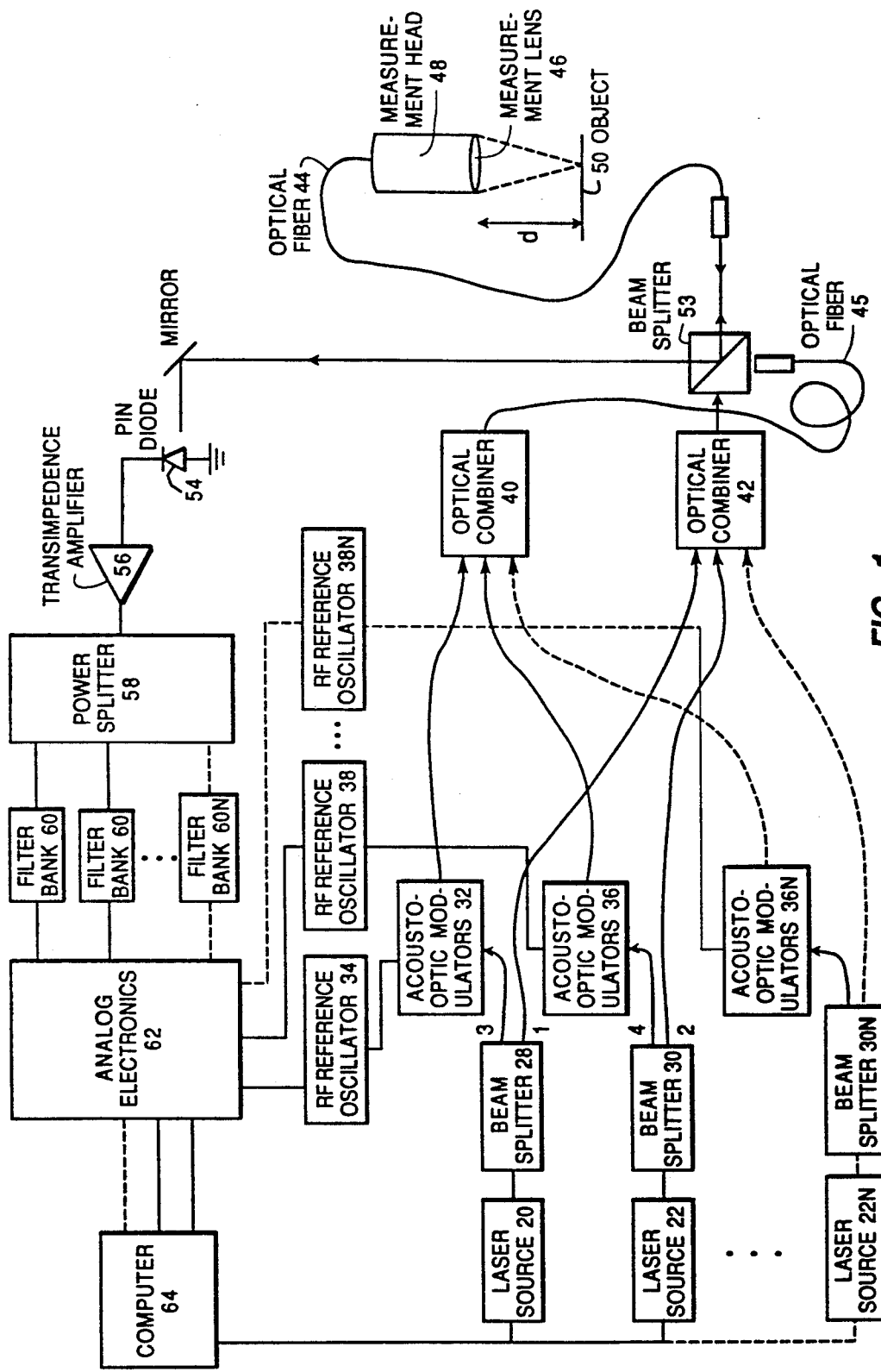
FIG. 1 is a block diagram of a multiwave interferometer which incorporates the teachings of the present invention.

Reference will now be made in detail to the presently preferred apparatus and method incorporating the invention as illustrated in the accompanying drawings, in which like reference characters designate like or corresponding parts throughout the several drawings.

Embodiment 1

As shown in FIG. 1, there is provided a multiwave interferometer which comprises laser sources 20 and 22, beam splitters 28 and 30, acoustooptic modulators 32 and 36, reference oscillators 34 and 38, optical combiners 40 and 42, beam splitter 53, optical fibers 44 and 45, measurement head 48, measurement head lens 46, PIN diode 54, transimpedence amplifier 56, power splitter 58, filter bank 60, analog electronics 62, and computer 64.

Laser sources 20 and 22 operate at different electronically variable wavelengths each determined by computer 64 and comprise, for example, laser diodes. The outputs of laser sources 20 and 22 are, thus, distinct wavelength beams. The output of laser source 20 is directed to beam splitter 28 where it is split into coherent measurement beam 1 and reference beam 3. The output of laser source 22 is directed to beam splitter 30 and split into coherent measurement beam 2 and reference beam 4.

Reference beam 3 is directed to acoustooptic modulator 32 driven by a first reference signal generated by RF reference oscillator 34. Acoustooptic modulator 32 shifts the frequency of reference beam 3 by an amount equal to the frequency of the first reference signal generated by RF reference oscillator 34. Because RF reference oscillator 34 operates in the RF band, the amount by which the wavelength of reference beam 3 is shifted is relatively small as compared to the wavelength of measurement beam 1. Thus, reference beam 3 may be said to maintain the same wavelength as measurement beam 1. Reference beam 3 is maintained coherent to measurement beam 1. It should be noted that, in the alternative, measurement beam 1 instead of reference beam 3 can be directed to acoustooptic modulator 32 and frequency shifted.

Similarly, reference beam 4 is directed to acoustooptic modulator 36 driven by a second reference signal generated by RF reference oscillator 38. The frequency of RF reference oscillator 38 is different than (i.e., distinct from) the frequency of RF reference oscillator 34. Acoustooptic modulator 36 shifts the frequency of reference beam 4 by an amount equal to the second reference signal generated by RF reference oscillator 38. Because RF reference oscillator 38, like RF reference oscillator 34, operates in the RF band, the amount by which the wavelength of reference beam 4 is shifted is relatively small as compared to the wavelength of measurement beam 2. Thus, reference beam 4 may be said to maintain the same wavelength as measurement beam 2. Reference beam 4 is maintained coherent to measurement beam 2. It should also be noted that, in the alternative, measurement beam 2 instead of reference beam 4 can be directed to acoustooptic modulator 36 and frequency shifted.

As should be apparent to those skilled in the art, it is also possible to induce the distinct frequency shifts between measurement beam 1 and reference beam 3 and between measurement beam 2 and reference beam 4, for example, by splitting the magnetic field of the emission lines of a gas laser, or by using optical parametric amplifiers, optical rotators, or piezoelectrically vibrated mirrors in place of acoustooptic modulators 28 and 30.

In addition, the wavelength of laser source 22 can be made variable by tuning the injection current of the laser diode of source 22. This allows the relationship between the wavelength or beams 1 and 3 and the wavelength of beams 2 and 4 to be adjusted to accommodate the need for balance between resolution and range.

Frequency-shifted reference beams 3 and 4 are directed to optical combiner 40 where they are coaxially combined, and then directed, via optical fiber 45, to beam splitter 53 located a fixed optical distance from measurement head lens 46. Measurement beams 1 and 2 are directed to optical combiner 42 where they are coaxially combined and then directed, to beam splitter 53, through optical fiber 44 and out of measurement head lens 46 of measurement head 48. Optical fiber 44 and measurement head lens 46 thus direct coaxially-combined measurement beams 1 and 2 to a surface of object 50. Object 50 is at an unknown distance d from measurement head lens 46. Optical combiners 40 and 42 comprise, for example, common glass beam splitters or fiber optical beam splitters.

As thus described, laser sources 20 and 22, beam splitters 28 and 30, acoustooptic modulators 32 and 36, optical combiners 40 and 42, and beam splitter 53 are connected in one example of an interferometric configuration.

The portions of coaxially-combined measurement beams 1 and 2 reflected from object 50 are received by measurement head lens 46 redirected back through optical fiber 44, and directed to beam splitter 53. Beam splitter 53 simultaneously combines the portions of coaxially-combined measurement beams 1 and 2 reflected from object 50 with frequency-shifted reference beams 3 and 4 to produce a combined optical signal. It should be noted that the combined optical signal comprises the portions of measurement beams 1 and 2 reflected from object 50 as well as frequency-shifted reference beams 3 and 4 and, therefore, includes the frequency components associated with each of them. The lengths of optical fibers 44 and 45 are preferably selected such that measurement beams 1 and 2, and reference beams 3 and 4 travel approximately the same total optical distance.

The combined optical signal is directed to photodetector 54 which comprises, for example, a PIN diode. Photodetector 54 simultaneously detects from the combined optical signal a plurality of heterodyne signals having various beat frequencies created by the interference of the portions of measurement beams 1 and 2 reflected from object 50 and frequency-shifted reference beams 3 and 4. The frequency response of photodetector 54, however, is such that only a first heterodyne signal having a beat frequency equal to the difference between the frequencies of the portion of measurement beam 1 reflected from object 50 and frequency-shifted reference beam 3, and a second heterodyne signal having a beat frequency equal to the difference between the frequencies of the portion of measurement beam 2 reflected from object 50 and frequency-shifted reference beam 4 are detected. All other heterodyne signals produced by the interfering beams are outside the frequency range of photodetector 54 and are therefore eliminated. It should be noted that the frequency of the first heterodyne signal is equal to the frequency of the first reference signal generated by RF reference oscillator 34 and contains phase information corresponding to distance d. Similarly, the frequency of the second heterodyne signal is equal to the frequency of the second reference signal generated by RF oscillator 38 and also contains phase information corresponding to distance d.

The first and second heterodyne signals simultaneously detected by photodetector 54 are directed to transimpedence amplifier 56, power splitter 58, filter bank 60, and analog electronics 62, in that order. Transimpedence amplifier 56 amplifies both the first and second heterodyne signals, and power splitter 58 and filter bank 60 electronically separate the first and second heterodyne signals from each other. It should be noted that a bank of mixers, each followed by a low pass filter, can also be used to separate the first and second heterodyne signals.

Analog electronics 62 operates to measure the phase difference, $\Phi_1$, between the first heterodyne signal and the first reference signal generated by RF reference oscillator 34, and the phase difference, $\Phi_2$, between the second heterodyne signal and the second reference signal generated by RF reference oscillator 38, wherein:

$$\Phi_1 = k_1 d \quad \Phi_2 = k_2 d; \text{ and} \tag{1.0}$$

$$k_1 = \frac{2\pi}{\lambda_1} \quad k_2 = \frac{2\pi}{\lambda_2} \tag{1.1}$$

$\lambda_1$ and $\lambda_2$ being the wavelengths at which laser sources 20 and 22 operate, respectively.

Phase differences $\Phi_1$ and $\Phi_2$ are between 0 and $2\pi$ radians and repeat themselves whenever d changes by an amount equal to one wavelength. In conventional interferometers, only one of $\Phi_1$ or $\Phi_2$ is used to compute d which results in a nonambiguous range of only one wavelength.

The two phase differences $\Phi_1$ and $\Phi_2$ measured by analog electronics 62 are directed to computer 64. Computer 64 computes distance d from the phase difference $\Delta\Phi$ between the two phase differences $\Phi_1$ and $\Phi_2$. Special analog electronics can also be constructed to calculate the phase difference $\Delta\Phi$ and thus distance d as follows:

$$\Delta\Phi = \phi_1 - \Phi_2 = (k_1 - k_2)d = \Delta k\, d \tag{1.2}$$

$$d = \frac{\Delta\Phi}{\Delta k} = \frac{\Delta\Phi}{2\pi} \frac{\lambda_1 \lambda_2}{(\lambda_1 - \lambda_2)} = \frac{\Delta\Phi}{2\pi} \lambda_{eq} \tag{1.3}$$

Because $\Delta\Phi$ repeats whenever d changes by $\lambda_{eq}$ (which is long) rather than whenever d changes by $\lambda$ (which is short) as in conventional interferometry, by using the multiwave technique of the present invention, the nonambiguous range is extended to $\lambda_{eq}$ which is long if $\lambda_1$ and $\lambda_2$ are close together, allowing absolute distance measurements within the range of $\lambda_{eq}$.

In general, the multiwave technique of the present invention can be used whether the two phase differences $\Phi_1$ and $\Phi_2$ in Eq. (1.0) are measured sequentially or simultaneously. However, if the two phase differences are measured sequentially, the object must remain stationary. Otherwise, if the location of the object changes slightly between phase measurements, even one half of a micron, the multiwave technique will be invalid. To measure the location of a moving object, the two phase differences $\Phi_1$ and $\Phi_2$ must be measured simultaneously. The present invention allows simultaneous phase measurement by separating the heterodyne signals before the phase differences are measured. Since the wavelengths of the reference and measurement beams are assigned different frequencies, any number of phase differences can be calculated simultaneously.

The above method can be repeated a plurality of times, each time shifting the wavelength of at least one of laser source 20 or 22 to sequentially measure a plurality of phase measurement pairs. The plurality of phase measurement pairs can then be processed by computer 64 to determine distance d with even higher accuracy and greater range. Similarly, if object 50 is moving at a high velocity, it may be necessary to measure a plurality of phase measurement pairs simultaneously, in which case, as shown in FIG. 1, an N number of laser sources 22N, beam splitters 30N, acoustooptic modulators 36N, reference oscillators 38N, and filters 60N may be provided, thereby increasing the number of measurement beams reflected onto object 50 in order to accurately determine distance d.

In an example of the first embodiment, the phase difference between two heterodyne signals and respective reference signals were calculated by analog electronics 62 at a rate of 500 KHz which allowed distance d to be accurately measured while object 50 was moving at a speed of 0.5 meters/second.

Embodiment 2

Figure 2:
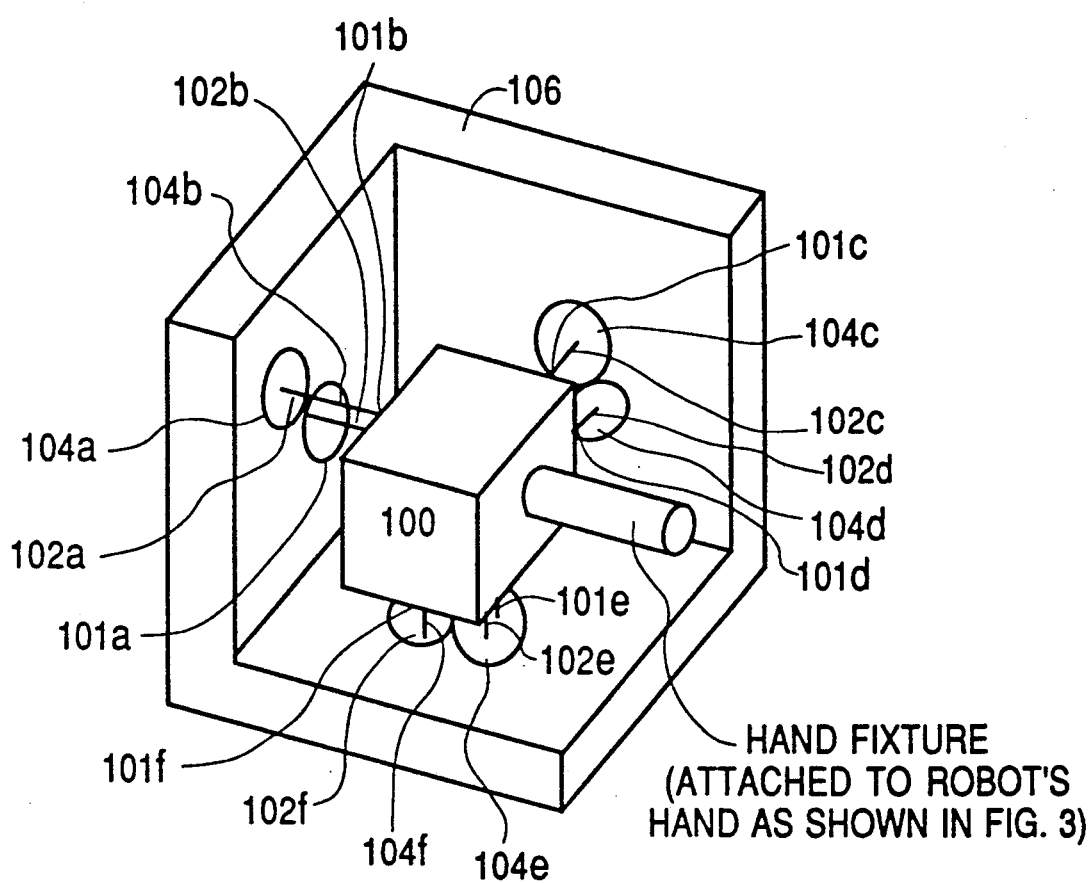
FIG. 2 is an illustration of a position and orientation sensor which is used according to the teachings of the present invention.

As shown in FIG. 2, there is provided a position and orientation sensor which comprises object fixture 100, measurement heads 101a-f, optical beams 102a-f, retroreflectors 104a-f, and base fixture 106.

As shown in FIG. 2, optical measurement heads 101a-f are grouped into three pairs 101a-b, 101c-d, and 101e-f, each pair being located on one of three distinct nonplanar surfaces of object fixture 100. Object fixture 100 can comprise any of a number of materials such as plastic, metal, wood, etc. Each of optical measurement heads 101a-f is substantially identical to measurement head 48 of FIG. 1 except that it emits a parallel beam. Each of optical measurement heads 101a-f emits a respective one of optical beams 102a-f. Each of optical beams 102a-f is directed towards a respective one of retroreflectors 104a-f. Retroreflectors 104a-f are grouped into three pairs 104a-b, 104c-d, and 104e-f, each pair being located on one of three distinct nonplanar surfaces of base fixture 106, and comprise, for example, mirrors or other optically reflective materials. Base fixture 106 can comprise any number of materials suitable for holding retroreflectors 104a-f such as plastic, metal, wood, etc.

The distance from each of optical measurement heads 101a-f to the respective one of retroreflectors 104a-f is measured using the multiwave measurement technique of the first embodiment. The six distance measurements are then used in any known geometric algorithm to determine the position and orientation of object fixture 100 with respect to base fixture 106.

Figure 3:
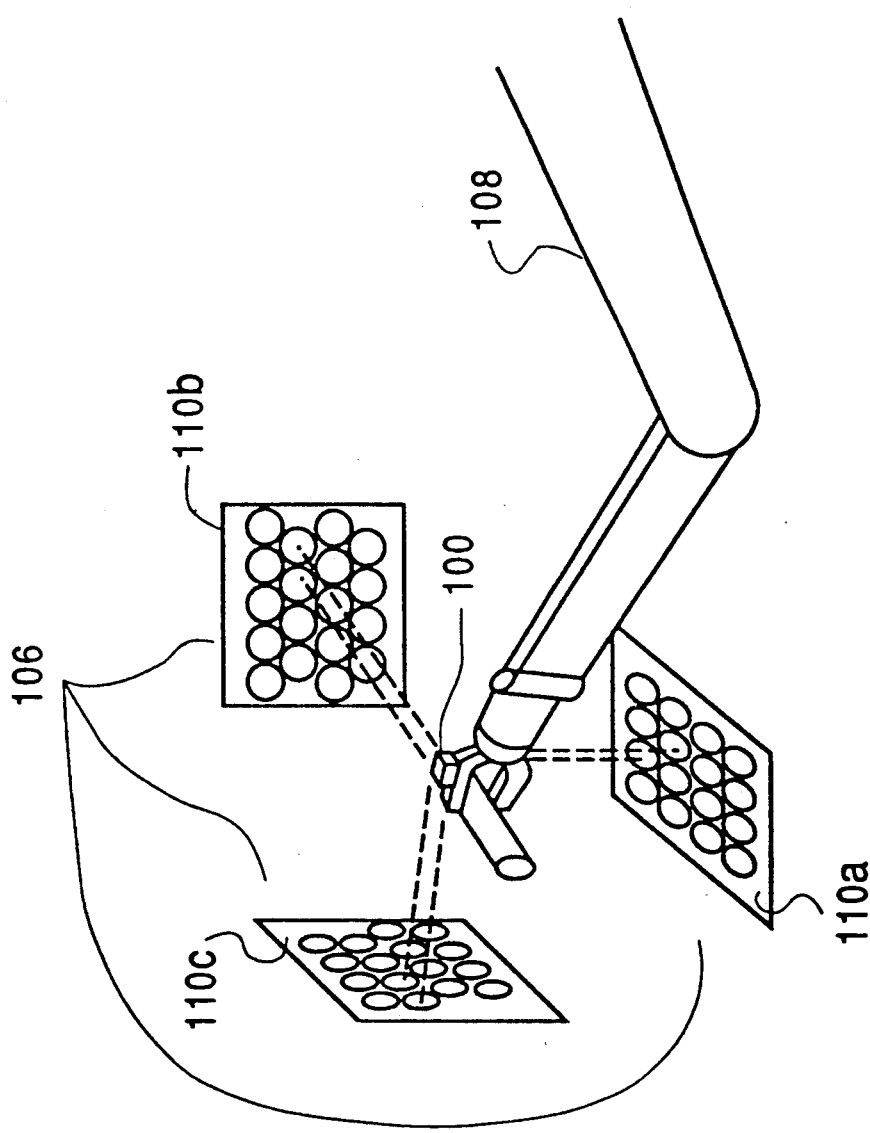
FIG. 3 illustrates the position and orientation sensor of FIG. 2 attached to a robot arm.

As shown in FIG. 3, the position and orientation sensor of FIG. 2 can be easily be adapted for use with robot arm 108 to accurately determine the position of robot arm 108 with respect to surrounding retroreflector arrays 110a-c even in the presence of high frequency vibrations caused by nearby machinery.

Because base fixture 106 is a passive device, the position and orientation sensor of FIG. 2 has a number of unique features. First, base fixture 106 can be placed in harsh environments without the need for special electrical shielding. Second, base fixture 106 is relatively inexpensive so that a number of base fixtures can be position around an object whose position and orientation are to be measure without significantly increasing the cost of the system. Third, base fixture 106 can be placed throughout a factory environment without requiring electrical cabling. In addition, because the position and orientation sensor of FIG. 2 utilizes a noncontact measurement method, the chances of damaging the object to be measured are reduced. Finally, the measurement range of the position and orientation sensor of FIG. 2 can be easily expanded by increasing the size of base fixture 106. This can easily be done by forming base fixture 106 from large retroflective arrays as shown in FIG. 3.

Embodiment 3

Figure 4:
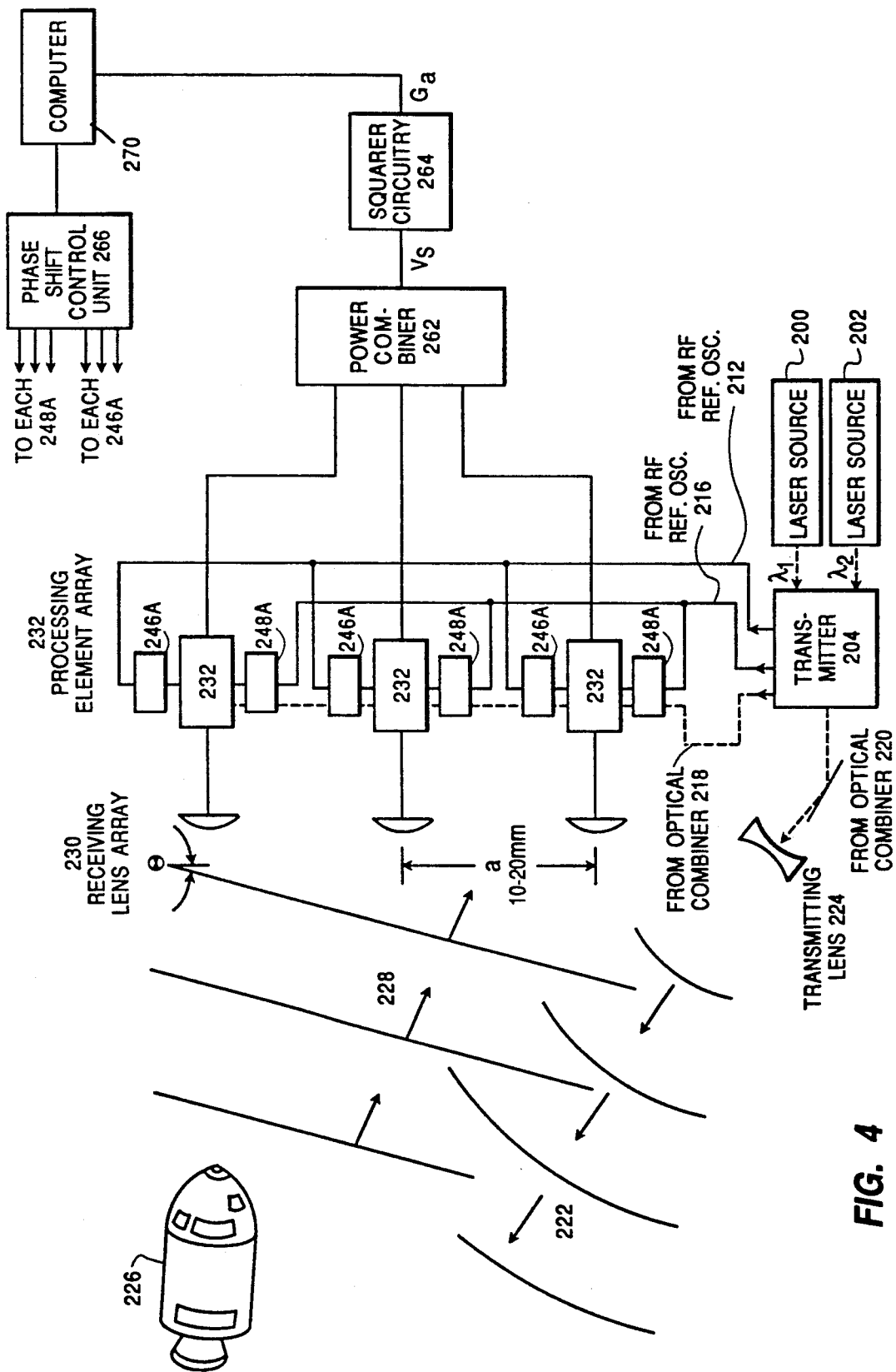
FIG. 4 is a block diagram of a multiwave optical phased array target tracking system incorporating the teachings of the present invention.

As shown in FIG. 4, there is provided a multiwave optical phased array target tracking system comprising laser sources 200 and 202, transmitter 204, transmitting lens 224, receiving lens array 230, processing element array 232, phase shifter arrays 246A and 248A, power combiner 262, squarer circuitry 264, phase shift control unit 266 and computer 270.

Figure 5:
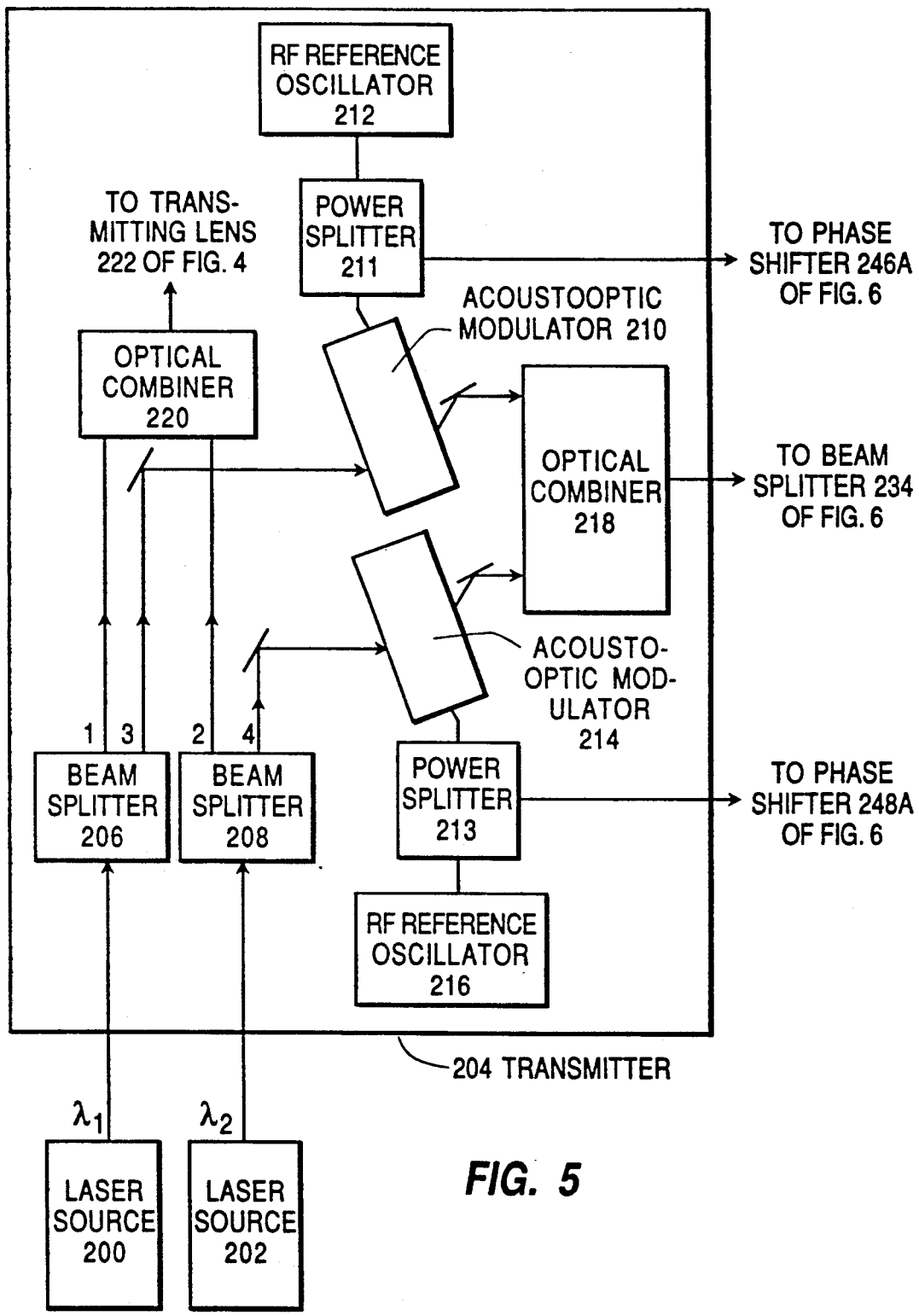
FIG. 5 is a block diagram of the transmitter electronics and optics of the system of FIG. 4.

Laser sources 200 and 202 operate at variable wavelengths $\lambda_1$ and $\lambda_2$, respectively, and comprise, for example, tunable lasers. The output beams from laser sources 200 and 202 are directed to transmitter 204. As shown in FIG. 5, transmitter 204 includes beam splitters 206 and 208, acoustooptic modulators 210 and 214, RF reference oscillators 212 and 216, RF power splitters 211 and 213, and optical combiners 218 and 220. The output of laser source 200 is directed to beam splitter 206 where it is split into coherent beams 1 and 3 and the output of laser source 202 is directed to beam splitter 208 where it is split into coherent beams 2 and 4.

Beam 3 is directed to acoustooptic modulator 210 driven by a first reference signal generated by RF reference oscillator 212. The first reference signal is directed to acoustooptic modulator 210 via power splitter 211. Acoustooptic modulator 210 shifts the frequency of beam 3 by an amount equal to the frequency of the first reference signal generated by RF reference oscillator 212. Because RF reference oscillator 212 operates in the RF band, the amount by which the frequency of beam 3 is shifted is relatively small as compared to the frequency of beam 3. It should be noted that, in the alternative, beam 1 instead of beam 3 can be directed to acoustooptic modulator 210 and frequency shifted.

Similarly, beam 4 is directed to acoustooptic modulator 214 driven by a second reference signal generated by RF reference oscillator 216. The second reference signal is directed to acoustooptic modulator 214 via power splitter 213. Acoustooptic modulator 214 shifts the frequency of beam 4 by an amount equal to the frequency of the second reference signal generated by RF reference oscillator 216. Because RF reference oscillator 216, like RF reference oscillator 212, operates in the RF band, the amount by which the frequency of beam 4 is shifted is relatively small as compared to the frequency of beam 4. It should also be noted that, in the alternative, beam 2 instead of beam 4 can be directed to acoustooptic modulator 214 and frequency shifted.

Frequency-shifted beams 3 and 4 are directed to optical combiner 218 where they are coaxially combined, and then directed, along with the first and second reference signals generated by RF reference oscillators 212 and 216, respectively, to receiving element array 232 shown in FIG. 4. Beams 1 and 2 are directed to optical combiner 220 where they are coaxially combined, and then directed to transmitting lens 224 also shown in FIG. 4. Optical combiners 218 and 220 comprise, for example, common glass beam splitters. Transmitting lens 224 transforms coaxially-combined beams 1 and 2 into expanding optical wave 222 and operates to direct coaxially-combined beams 1 and 2 onto a surface of object 226. Object 226 comprises, for example, a spacecraft approaching a space station, or a robot in a workcell. Transmitting lens 224 comprises, for example, a concave lens.

A portion of expanding optical wave 222 is reflected from object 226 as reflected optical wave 228 and is detected by receiving lens array 230. Receiving lens array 230 detects reflected optical wave 228 and comprises N receiving lenses each separated by distance a. It should be noted that the receiving array could consist of an array of photodetractors. Reflected optical wave 228 is incident to the line defined by receiving lens array 230 at an unknown angle $\theta$ whereby the nth receiving lens of receiving lens array 230 detects signals $s_1$ and $s_2$ due to $\lambda_1$ and $\lambda_2$ given by:

$$s_1 = S_1 \sin((\omega_1 t + 2\pi n a/\lambda_1)\sin\theta) \quad (3.0a)$$

$$s_2 = S_2 \sin((\omega_2 t + 2\pi n a/\lambda_2)\sin\theta) \quad (3.0b)$$

where $S_1$ and $S_2$ are the amplitudes of $s_1$ and $s_2$ and $s_1$ and $s_2$ are the signals comprising the portion of expanding optical wave 222 reflected from object 226 as reflected optical wave 228 that are detected by each receiving lens of receiving lens array 230, $\omega_1$ and $\omega_2$ are the angular frequencies of the output beams generated by laser sources 200 and 202, respectively, $\lambda_1$ and $\lambda_2$ are the wavelengths at which laser sources 200 and 202 operate, respectively, and n designates the nth receiving lens of receiving lens array 230. The phases of signals $s_1$ and $s_2$ generated by the nth receiving lens of receiving lens array 230 are measured with respect to the phases of signals $s_1$ and $s_2$ detected by the first receiving lens of receiving lens array 230. There is also a phase shift corresponding to the distance from receiving lens array 230 to object 266 in the arguments of Eqs. (3.0a) and (3.0b). However, this phase shift for the processed signal at the output of analog squarer and divider circuit 258 is substantially constant for each of the receiving lenses because the distance from receiving lens array 230 to object 226 is very long with respect to distance a and, therefore, can be eliminated by signal processing. It should be noted that reflected optical wave 228 comprises beams 1 and 2 outputted from transmitter 204 and converted to expanding optical wave 222 by transmitting lens 224, and, therefore, includes the frequency components associated with each of them.

Figure 6:
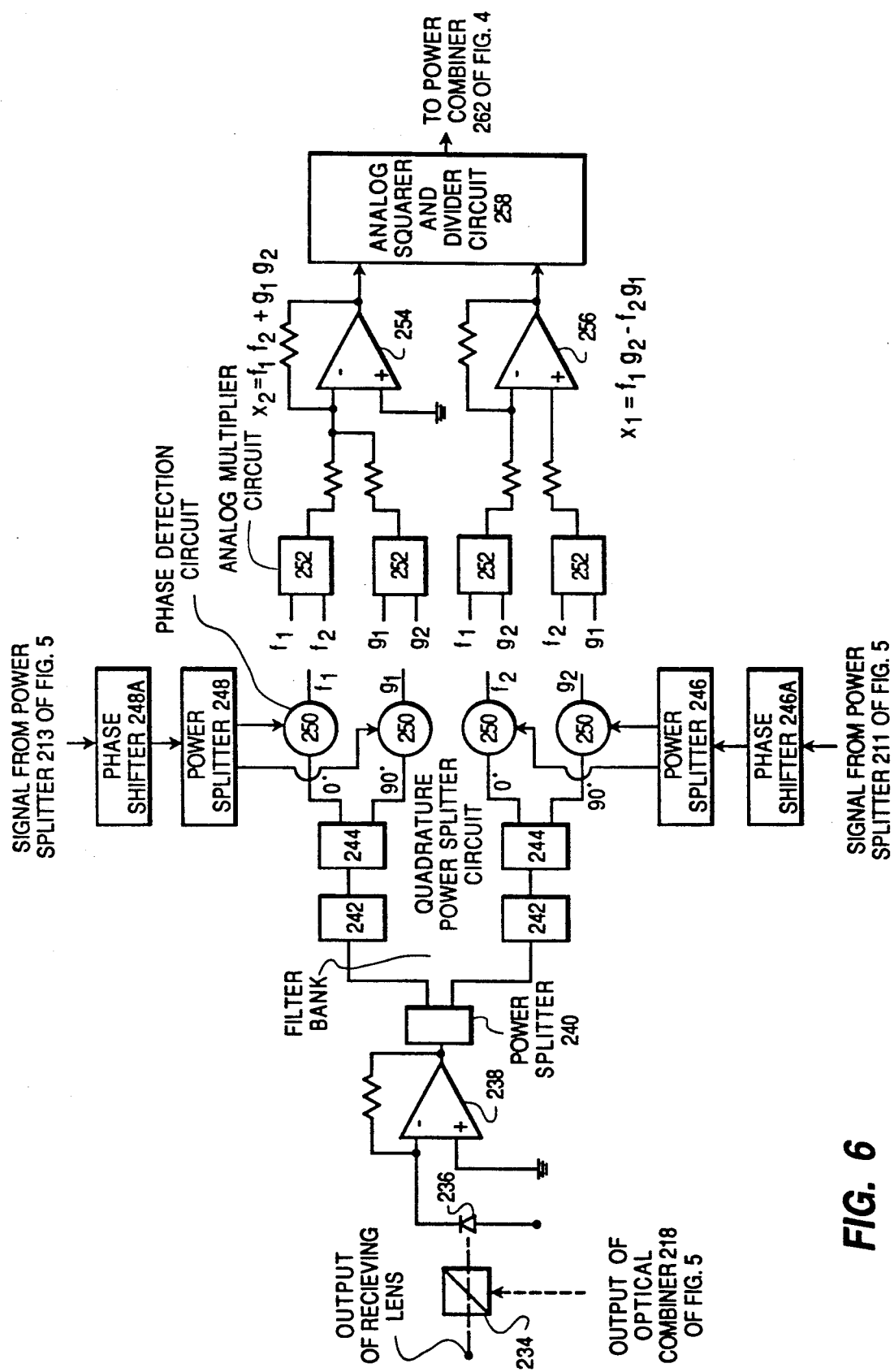
FIG. 6 is a block diagram of the electronics of a single receiving element of the system of FIG. 4.

The output of each receiving lens of receiving lens array 230 is directed to a corresponding processing element of processing element array 232. As shown in FIG. 6, each processing element of processing element array 232 comprises beam splitter 234, photodetector 236, amplifier 238, power splitter 240, filter bank 242, quadrature power splitter circuits 244, power splitters 246 and 248, phase detection circuits 250, analog phase shifters 246A and 248A multiplier circuits 252, summer circuit 254, difference circuit 256, and analog squarer and divider circuit 258.

Operation of a single processing element of processing element array 232 will now be described. As shown in FIG. 6, the output of a receiving lens of receiving lens array 230 is directed to beam splitter 234. Beam splitter 234 combines the portion of reflected optical wave 228 detected by the receiving lens with frequency-shifted beams 3 and 4 to produce a combined optical signal. It should be noted that the combined optical signal comprises the portions of beams 1 and 2 reflected from object 226 and detected by the receiving lens as well as frequency-shifted beams 3 and 4 and, therefore, includes the frequency components associated with each of them.

The combined optical signal is directed to photodetector 236 which comprises, for example, a photodiode. Photodetector 236 simultaneously detects from the combined optical signal a plurality of heterodyne signals having various beat frequencies created by the interference of the portions of beams 1 and 2 reflected from object 226 and frequency-shifted beams 3 and 4. The frequency response of photodetector 236, however, is such that only a first heterodyne signal having a first beat frequency equal to the difference between the frequencies of reflected beam 1 and frequency-shifted beam 3, and a second heterodyne signal having a beat frequency equal to the difference between the frequencies of reflected beam 2 and frequency-shifted beam 4 are detected. All other heterodyne signals produced by the interfering beams are outside the frequency range of photodetector 236 and are therefore eliminated. It should be noted that the frequency of the first heterodyne signal is equal to the frequency of the first reference signal generated by RF reference oscillator 212, and that the frequency of the second heterodyne signal is equal to the frequency of the second reference signal generated by RF reference oscillator 216.

The first and second heterodyne signals simultaneously detected by photodetector 236 are directed to transimpedence amplifier 238, power splitter 240, and filter bank 242 in that order. Transimpedence amplifier 238 amplifies both the first and second heterodyne signals, and power splitter 240 and filter bank 242 electronically separate the first heterodyne signal from the second heterodyne signal. Each of the first and second heterodyne signals is directed to quadrature power splitter circuit 244 where it is separated into 0° and 90° quadrature components.

Each quadrature component of the first and second heterodyne signals, in addition to the first and second reference signals generated by RF reference oscillators 212 and 216, respectively, are directed to phase detection circuits 250. As shown in FIG. 6, the first and second reference signals generated by RF reference oscillators 212 and 216 are directed to phase detection circuits 250 via phase shifters 246A and 248A and power splitter 246 and 248, respectively. Phase detection circuits 250 detect the phase differences between each of the quadrature components of the first heterodyne signal and the first reference signal generated by RF reference oscillator 212, and the phase differences between each of the quadrature components of the second heterodyne signal and the second reference signal generated by RF reference oscillator 216. The signals detected by phase detection circuits 250 are in-phase signals $g_1$ and $g_2$ and quadrature signals $f_1$ and $f_2$ given by:

$$f_1 = A\sin((2\pi an/\lambda_1)\sin\theta) \quad (3.1a)$$

$$f_2 = A\sin((2\pi an/\lambda_2)\sin\theta) \quad (3.1b)$$

$$g_1 = A\cos((2\pi an/\lambda_1)\sin\theta) \quad (3.2a)$$

$$g_2 = A\cos((2\pi an/\lambda_2)\sin\theta) \quad (3.2b)$$

wherein A is the amplitude of signals $f_1$, $f_2$, $g_1$ and $g_2$, and depends on the amplitude of the first and second heterodyne signals.

In-phase signals $g_1$ and $g_2$ and quadrature signals $f_1$ and $f_2$ are directed to analog multiplier circuits 252, summer and difference circuits 254 and 256, and analog squarer and divider circuit 258 in that order. Analog multiplier circuit 252, summer and difference circuits 254 and 256, and analog squarer and divider circuit 258 combine the phase differences detected by phase detection circuit 250 in an ordered way to produce a receiving element output.

Analog multiplier circuit 252 comprises four analog multipliers while summer and difference circuits 254 and 256 comprise, for example, operational amplifiers and appropriate input resistors. The signals $x_1$ and $x_2$ generated by analog multiplier circuit 252 and summer and difference circuits 254 and 256, and corresponding to equivalent wavelength $\lambda_{eq}$ are given by:

$$x_1 = f_1 g_2 - f_2 g_1 = A^2\sin((2\pi an/\lambda_{eq})\sin\theta) \quad (3.3a)$$

$$x_2 = f_1 f_2 + g_1 g_2 = A^2\cos((2\pi an/\lambda_{eq})\sin\theta) \quad (3.3b)$$

where: $\lambda_{eq} = (\lambda_1\lambda_2)/(\lambda_2-\lambda_1)$

Signals $x_1$ and $x_2$ are directed to analog squarer and divider circuit 258 which generates the following processing element output signal:

$$\sin((2\pi an/\lambda_{eq})\sin\theta) = x_1/(x_1^2+x_2^2)^{\frac{1}{2}} \quad (3.4)$$

As shown in FIGS. 5 and 6, the signals generated by RF reference oscillators 212 and 216 are phase shifted by phase shifters 246A and 248A, respectively. Each of phase shifters 246A and 248A applies a phase shift of:

$$\frac{2\pi}{\lambda_{eq}} an\sin\theta_o \quad (3.5)$$

then the output of each processing element of processing element array 232 is:

$$\sin\left(\frac{2\pi an}{\lambda_{eq}}(\sin\theta - \sin\theta_o)\right) \quad (3.6)$$

where $\theta_o$ is the direction of maximum reception with respect to the line defined by receiving lens array 230.

The outputs of all the processing elements of processing element array 232 are directed to power combiner 262, and squarer circuit 264 in that order. Power combiner 262 electrically combines the outputs of each processing element of processing element array 232 to produce signal $V_s$. Squarer circuitry 264 converts $V_s$ to a reception pattern signal $G_a$ given by:

$$G_a = |v_s|^2/N^2 \quad (3.7)$$
$$= \sin^2[N\pi(a/\lambda_{eq})(\sin\theta - \sin\theta_o)]/N^2 \sin_2[\pi(a/\lambda_{eq})\sin\theta - \sin\theta_o)]$$

where N is the number of receiving lenses of receiving lens array 230 and the condition for no sidelobes to appear is:

$$a < \lambda_{eq}/2 \quad (3.8)$$

Reception pattern signal $G_a$ is then analyzed by phase shift control unit 266 wherein the phase shift applied by each phase shifter of phase shifter arrays 246A and 248A is varied so as to scan reception pattern $G_a$ across a given area.

Figure 7:
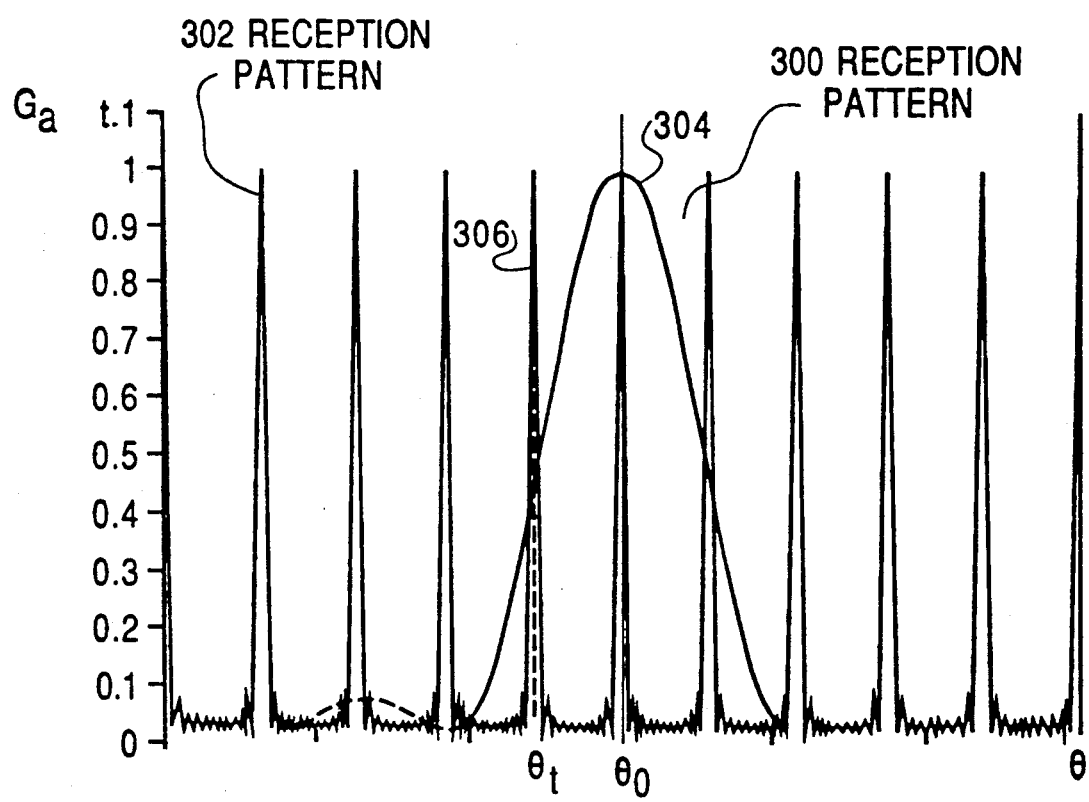
FIG. 7 illustrates various reception patterns created by the system of FIG. 4.

The use of this multiwave technique to determine the angular bearing of object 226 with respect to the line formed by receiving lens array 230 is illustrated in FIG. 7. Assume object 226 is at an unknown bearing of $\theta_t$. To obtain a rough estimate of $\theta_t$, the wavelengths of laser sources 200 and 202 should be close enough such that $\lambda_{eq}$ is long and no side lobes appear in reception pattern 300. Next, the reception pattern is scanned over a given area by varying the phase shift applied to phase shifting elements 246A and 248A. Once it has been determined that object 226 lies within lobe 304 of reception pattern 300, $\theta_t$ can be measured with even higher accuracy by shifting the wavelengths of laser sources 200 and 202 closer so that $\lambda_{eq}$ is made shorter resulting in reception pattern 302. Although reception pattern 302 contains many sidelobes, the rough estimate of the location of object 226 established by reception pattern 300 ensures that the object 226 lies within lobe 306 of reception pattern 302. By using a shorter $\theta_{eq}$, the bearing of angle $\lambda_t$ of object 226 can be measured with greater accuracy because the slope of $G_a$ versus $\theta$ is much sharper for reception pattern 302 than for reception pattern 300.

By using this multiwave technique, the bearing angle $\theta_t$ of object 226 can be measured within a large range and with high accuracy. In addition, the sweep rate of reception pattern $G_a$ can be increased to determine the angular bearing of object 226 even if object 226 is moving at a high velocity. Also, a plurality of identical multiwave optical phased array target tracking systems can be utilized to determine not only the angular bearing of object 226 but also the distance to it by using any number of triangulation or time-of-flight measurement techniques.

Additional advantages and modifications will readily occur to those skilled in the art. Therefore, the invention in its broader aspects is not limited to the specific details, representative devices, and illustrative examples shown and described. Accordingly, departures may be made from such details without departing from the spirit or scope of the general inventive concept as defined by the appended claims and their equivalents.

What is claimed is:

1. A method of measuring the angular bearing of an object with respect to a reference line defined by first and second receiving elements using first and third optical beams which have the same first wavelength and are in phase with each other, and second and fourth optical beams which have the same second wavelength and are in phase with each other, said second wavelength being different than said first wavelength, comprising the steps of:

frequency shifting one of said first beam and third beam using a first reference signal;

frequency shifting one of said second beam and fourth beam using a second reference signal;

directing said first and second beams onto a surface of said object so that portions of said first and second beams are reflected from said object;

detecting portions of both said reflected first and second beams with both said first and second receiving elements;

combining the portions of said reflected first and second beams detected by said first receiving element with said third and fourth beams to produce a first combined optical signal;

combining the portions of said reflected first and second beams detected by said second receiving element with said third and fourth beams to produce a second combined optical signal;

detecting from said first combined optical signal a first heterodyne signal having a first beat frequency equal to the difference between the frequency of said reflected first beam and the frequency of said third beam, and a second heterodyne signal having a second beat frequency equal to the difference between the frequency of said reflected second beam and the frequency of said fourth beam;

detecting from said second combined optical signal a third heterodyne signal having a third beat frequency equal to the difference between the frequency of said reflected first beam and the frequency of said third beam, and a fourth heterodyne signal having a fourth beat frequency equal to the difference between the frequency of said reflected second beam and the frequency of said fourth beam;

combining the phase difference between said first heterodyne signal and said first reference signal, and the phase difference between said second heterodyne signal and said second reference signal in an ordered way to produce a first receiving element output;

combining the phase difference between said third heterodyne signal and said first reference signal, and the phase difference between said fourth heterodyne signal and said second reference signal in an ordered way to produce a second receiving element output; and sequentially shifting the phase of said first and second receiving element outputs to determine the bearing angle of said object with respect to said reference line.

2. An apparatus for measuring the angular bearing of an object with respect to a reference line defined by first and second receiving elements having first and third optical beams which have the same first wavelength and are in phase with each other, and second and fourth optical waves which have the same second wavelength and are in phase with each other, said second wavelength being different than said first wavelength, comprising:

means for frequency shifting one of said first beam and third beam using a first reference signal;

means for frequency shifting one of said second beam and fourth beam using a second reference signal;

means for directing said first and second beams onto a surface of said object so that portions of said first and second beams are reflected from said object;

means for detecting portions of both said reflected first and second beams with both said first and second receiving elements;

means for combining the portions of said reflected first and second beams detected by said first receiving element with said third and fourth beams to produce a first combined optical signal;

means for combining the portions of said reflected first and second beams detected by said second receiving element with said third and fourth beams to produce a second combined optical signal;

means for detecting from said first combined optical signal a first heterodyne signal having a first beat frequency equal to the difference between the frequency of said reflected first beam and the frequency of said third beam, and a second heterodyne signal having a second beat frequency equal to the difference between the frequency of said reflected second beam and the frequency of said fourth beam;

means for detecting from said second combined optical signal a third heterodyne signal having a third beat frequency equal to the difference between the frequency of said reflected first beam and the frequency of said third beam, and a fourth heterodyne signal having a fourth beat frequency equal to the difference between the frequency of said reflected second beam and the frequency of said fourth beam;

means for combining the phase difference between said first heterodyne signal and said first reference signal, and the phase difference between said second heterodyne signal and said second reference signal in an ordered way to produce a first receiving element output;

means for combining the phase difference between said third heterodyne signal and said first reference signal, and the phase difference between said fourth heterodyne signal and said second reference signal in an ordered way to produce a second receiving element output; and means for sequentially shifting the phase of said first and second receiving element outputs to determine the bearing angle or said object with respect to said reference line.

3. A multiple wavelength heterodyne interferometer for measuring a length of an optical path, the length being variable, by simultaneously measuring an optical phase of a plurality of wavelengths or combinations of wavelengths, comprising:

means for separating a plurality of light beams into pairs of reference beams and corresponding measurement beams, said light beams each having a distinct wavelength, and said reference and said measurement beams being in random polarization states;

means for frequency shifting at least one of said reference and measurement beams of each of said pairs;

means for coaxially combining each of said reference beams to form a single, combined reference beam;

means for coaxially combining each of said measurement beams to form a single, combined measurement beam;

means for directing said combined measurement beam along said optical path;

means for combining and interfering said combined reference beam and said combined measurement beam directed along said optical path on a surface of a photodetector to produce distinct differential frequency signals, said combined reference and combined measurement beams being combined and interfered independently of polarization states of said combined reference and combined measurement beams; and means for determining phases or combinations of phases between said differential frequency signals or between combinations of said differential frequency signals.

* * * * *

UNITED STATES PATENT AND TRADEMARK OFFICE
CERTIFICATE OF CORRECTION

PATENT NO. : 5,106,192

DATED : April 21, 1992

INVENTOR(S) : Michael R. Tucker and Eric S. Christenson

It is certified that error appears in the above-identified patent and that said Letters Patent is hereby corrected as shown below:

On title page, item [73]
In the "Assignee" portion, "Eastman" should read --Fastman--.

Title page, item [54] and col. 1, "INTERFEROMETERIC" should read --INTERFEROMETRIC--; and Lines 3 and 4, "POSITION" and "BEARING" should be followed by a comma (,)

Claim 2, column 14, line 54, "or" should read --of--.

Signed and Sealed this

Third Day of August, 1993

MICHAEL K. KIRK

Attest:

*Attesting Officer*                *Acting Commissioner of Patents and Trademarks*